(12) United States Patent
Davidson et al.

(10) Patent No.: US 7,633,932 B2
(45) Date of Patent: *Dec. 15, 2009

(54) ACCELERATED REMOVAL FROM SERVICE OF A SIGNAL PROCESSOR AT A MEDIA GATEWAY

(75) Inventors: Charles Lewis Davidson, Middletown, NJ (US); Mark Daniel Rajcok, Toms River, NJ (US)

(73) Assignee: Avaya Inc., Basking Ridge, NJ (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/562,956

(22) Filed: Nov. 22, 2006

(65) Prior Publication Data

US 2008/0117898 A1 May 22, 2008

(51) Int. Cl.
*H04L 12/66* (2006.01)

(52) U.S. Cl. .................. 370/352; 370/360; 370/401; 370/426; 714/13; 714/11; 714/10; 709/250

(58) Field of Classification Search ............ 714/10–13; 370/352; 709/231; 395/200.47
See application file for complete search history.

(56) References Cited

U.S. PATENT DOCUMENTS

| | | | |
|---|---|---|---|
| 5,802,298 A * | 9/1998 | Imai et al. .................. 709/217 |
| 6,502,206 B1 * | 12/2002 | Kosuge et al. .................. 714/13 |
| 6,606,298 B1 | 8/2003 | Foltak | |
| 6,958,972 B2 | 10/2005 | Foltak | |
| 2003/0126275 A1 * | 7/2003 | Mungavan et al. .......... 709/231 |
| 2006/0045102 A1 | 3/2006 | Pelaez et al. | |
| 2006/0080469 A1 * | 4/2006 | Coward et al. .............. 709/250 |
| 2007/0177577 A1 * | 8/2007 | Kolor et al. .................. 370/352 |

* cited by examiner

*Primary Examiner*—Curtis Kuntz
*Assistant Examiner*—Phung-Hoang J Nguyen
(74) *Attorney, Agent, or Firm*—DeMont & Breyer, LLC

(57) ABSTRACT

A method is disclosed that enables accelerating the removal from service of a signal processor at a media gateway. In accordance with the illustrative embodiment of the present invention, the media gateway receives an indication to remove one of its digital signal processors from service. Instead of waiting for all of the calls that are using the signal processor to come to an end, the media gateway proactively moves the packet streams from the signal processor to one or more other signal processors resident at the gateway. Advantageously, an effort is made to avoid having to inform the corresponding media gateway controller of the move, thereby minimizing any discontinuity in each moved packet stream.

17 Claims, 7 Drawing Sheets

ACCELERATED REMOVAL FROM SERVICE OF A SIGNAL PROCESSOR AT A MEDIA GATEWAY

FIELD OF THE INVENTION

The present invention relates to telecommunications in general, and, more particularly, to moving packet streams that are being handled by a first signal processor to one or more other signal processors at a media gateway.

BACKGROUND OF THE INVENTION

A modern telecommunications system often comprises one or more switched telephone networks and one or more Internet Protocol-based packet networks. These two different types of networks are interconnected by a media gateway, which acts as a translator between the two types of networks. The media gateway enables multimedia communications, such as voice and video, over multiple transport protocols end to end.

Because the media gateway connects different types of networks, one of its main functions is to convert between the different transmission and coding techniques used across the different networks. For example, a Voice-over-Internet-Protocol-capable (VoIP-capable) media gateway performs the conversion between time division multiplexed voice media that originate at a switched telephone network telecommunications terminal and VoIP datagram media that is intended for an Internet Protocol network terminal, as part of a telephone conversation between two parties; of course, the media gateway has to perform the conversion in the other direction as well. Other functions that the media gateway provides are echo cancellation, tone detection, tone generation (e.g., dual tone multi-frequency tones, etc.), and conferencing.

Since a packet stream that is received from the Internet Protocol network comprises data packets and control packets, which contain addressing information, the VoIP media gateway converts the received packets to a time division multiplexed stream while processing the control packets. The media gateway must perform the conversion in a timely manner to minimize the possibility of packet loss, which the listening party on a call might perceive. To handle all of the packets responsively and without unacceptable delay or jitter, the media gateway uses digital signal processors, which are dedicated devices that are capable of the high-speed packet processing that is required for the conversion. Each digital signal processor comprises multiple processing resources, such as processing channels, to handle multiple calls and the different conversion formats across the calls. For example, the conversion formats might be distinguished from one another by codec type, encryption algorithm, payload values, addressing information, or redundancy in the information transmitted. Protocol standards and formulas exist that govern these properties, such as G.711 and G.729 compression/decompression algorithms. Similarly, the media gateway must also perform the conversion in the other direction from a time division multiplexed stream to Internet Protocol packets in a timely manner.

One or more media gateways are controlled by a media gateway controller, which provides the call control and signaling functionality for each media gateway and across media gateways. Communication between media gateways and media gateway controllers is achieved by means of protocols such as H.248, Media Gateway Control Protocol (MGCP), and so forth. During a call initialization that involves an Internet Protocol (IP) terminal, the media gateway controller provides to the IP terminal the IP address of the media gateway resource that is handling the call. This enables the IP terminal to specify the proper destination address of the packets that it originates and to recognize the packets that are being sent to the terminal. Alternatively, instead of a call involving an IP terminal, the call could involve another media gateway that exchanges packets with the aforementioned media gateway resource that is handling the call.

On occasion, it might become necessary, under certain conditions, to remove an in-service digital signal processor from service. For example, when a technician has to diagnose or physically replace the signal processor, a technician will typically need to "busy out" the processor. What makes this difficult is that the signal processor might be handling the packet streams that correspond to one or more currently active calls between a telecommunications terminal in one type of network, such as the IP network, and a terminal in another type of network, such as the switched telephone network, described earlier. Techniques in the prior art require that the technician issue a graceful busy-out command for a selected signal processor, only to have to wait for its calls to terminate before the processor can be fully removed from service. This can be a lengthy procedure, especially if some calls that are being handled by the selected signal processor are long in duration.

What is needed is a technique to accelerate the removal from service of a signal processor at a media gateway, without some of the disadvantages in the prior art.

SUMMARY OF THE INVENTION

The present invention enables accelerating the removal from service of a signal processor at a media gateway, without some of the disadvantages in the prior art. In accordance with the illustrative embodiment of the present invention, the media gateway receives an indication to remove one of its digital signal processors from service. Instead of waiting for all of the calls that are using the signal processor to come to an end, the media gateway proactively moves the packet streams from the signal processor to one or more other signal processors resident at the gateway. Advantageously, an effort is made to avoid having to inform the corresponding media gateway controller of the move, thereby minimizing any discontinuity in each moved packet stream.

The media gateway of the illustrative embodiment comprises multiple signal processing units, each comprising a plurality of digital signal processors and each being uniquely addressable by an Internet Protocol address. In addition, each signal processing unit has its own address space of port numbers, each number being allocable to a packet stream that is being processed by a processing resource, such as a digital signal processing channel, on the signal processing unit. By simply reassigning each port number in use on the processor being busied out (i.e., the "affected" processor on the "affected" signal processing unit) to another processor on the same signal processing unit, the media gateway of the illustrative embodiment avoids having to inform the media gateway controller; this is because only the media gateway needs to know the new assignment of each port number, in order to properly route each packet stream. And when a processing resource is available, but not on the affected signal processing unit, the media gateway of the illustrative embodiment transmits a change request message to the media gateway controller, specifying the IP address of the new signal processing unit so that the controller can inform the IP terminal of the change in IP address. By using this two-tiered approach, the media gateway is able to accelerate the moving of the packet streams to their new processing resources while minimizing discontinuities in the packet streams. As a result, the technique in the illustrative embodiment accelerates the busying-out process of the affected digital signal processor as well.

The illustrative embodiment of the present invention comprises: receiving a first indication to remove from service a first signal processor that is handling a first packet stream via a first processing resource, wherein the first processing resource is addressable by a first port number; determining, in response to receiving the first indication, whether a second signal processor is available to handle the first packet stream; and when the second signal processor is available, reassigning the first port number to a second processing resource in the second signal processor.

DETAILED DESCRIPTION

Figure 1:
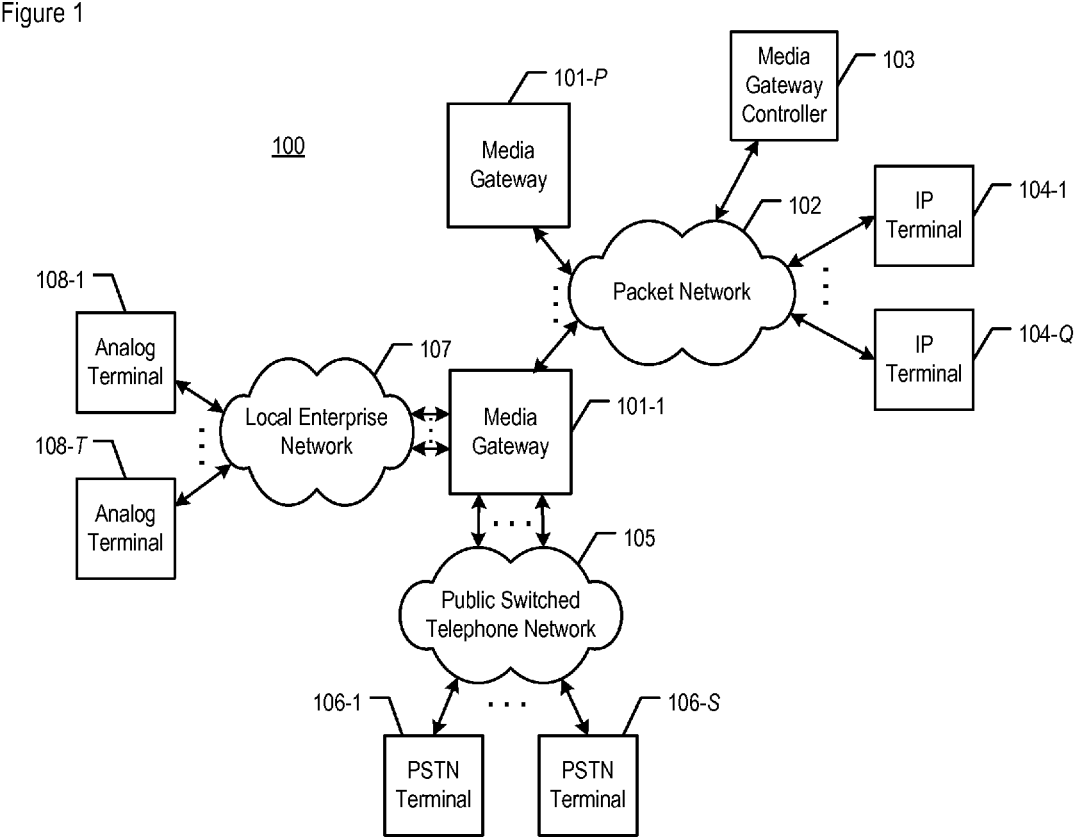
FIG. 1 depicts a schematic diagram of telecommunications system 100, in accordance with the illustrative embodiment of the present invention.

FIG. 1 depicts a schematic diagram of telecommunications system 100, in accordance with the illustrative embodiment of the present invention. Telecommunications system 100 comprises:

i. media gateways 101-1 through 101-P, wherein P is a positive integer;
ii. Internet Protocol (IP) packet network 102;
iii. media gateway controller 103;
iv. IP telecommunications terminals 104-1 through 104-Q, wherein Q is a positive integer;
v. Public Switched Telephone Network (PSTN) 105;
vi. PSTN telecommunications terminals 106-1 through 106-S, wherein S is a positive integer;
vii. local enterprise network 107; and
viii. analog telecommunications terminals 108-1 through 108-T, wherein T is a positive integer.

All of the elements depicted in FIG. 1 are interconnected as shown.

Media gateway 101-$p$, for p=1 through P, is a data-processing system that comprises media gateway functionality that is known in the art, acting as a translator between two types of networks in well-known fashion; as depicted, media gateway 101-1 acts as a translator between Internet Protocol network 102 and Public Switched Telephone Network 105 or between network 102 and local enterprise network 107, which networks are described below. The salient components of media gateway 101-$p$ are described below and with respect to FIGS. 2 and 3. Media gateway 101-$p$ enables multimedia communications, such as voice and video, over multiple transport protocols from one terminal in one network to another terminal in another network, in part by working in concert with media gateway controller 103 to set up, maintain, and terminate calls.

Because media gateway 101-$p$, including media gateway 101-1, connects different types of networks, one of its main functions is to convert between the different transmission and coding techniques uses across the different networks. In accordance with the illustrative embodiment, media gateway 101-1 is a Voice-over-Internet-Protocol-capable (VoIP-capable) media gateway that performs the conversion between time division multiplexed voice signals that originate at a switched telephone network telecommunications terminal, such as one of terminals 106-1 through 106-S, and VoIP signals that are intended for an Internet Protocol network terminal, such as one of IP terminals 104-1 through 104-Q, as part of a telephone conversation between two parties. Media gateway 101-1 performs the conversion in the reverse direction as well (i.e., from an IP terminal to a PSTN terminal) and is able to perform bidirectional conversion for multiple calls concurrently.

Media gateway 101-1 in the illustrative embodiment comprises voice packet-processing functionality. However, as those who are skilled in the art will appreciate, in some alternative embodiments of the present invention, media gateway 101-$p$ is able to process packets that contain other types of bearer information such as video.

Media gateway 101-$p$ executes the tasks described below and with respect to FIGS. 4 through 7 in supporting the functionality of the illustrative embodiment. Although a media gateway executes the tasks of the illustrative embodiment, in some alternative embodiments another type of data-processing system can be used to execute those tasks, as those who are skilled in the art will appreciate. Furthermore, in accordance with the illustrative embodiment, media gateway 101-$p$ communicates with media gateway controller 103 via the H.248 protocol, but as those who are skilled in the art will appreciate, in some alternative embodiments media gateway 101-$p$ can communicate in accordance with a different type of call-control protocol and can handle datagram packets other than Internet Protocol packets. In any event, it will be clear to those skilled in the art, after reading this specification, how to make and use media gateway 101-$p$.

As depicted, media gateway 101-1 is interconnected with a plurality of different types of networks, including Internet Protocol Packet Network 102, Public Switched Telephone Network 105, and local enterprise network 107. Internet Protocol packet network 102 comprises one or more transmission-related nodes such as routers that are used to direct data packets from one or more sources to the correct destinations of those packets. Network 102 is capable of handling, in well-known fashion, Internet Protocol-based messages that are transmitted among two or more Internet Protocol-capable devices such as (i) one or more IP terminals 104-1 through 104-Q and (ii) a media gateway such as gateway 101-1, or between media gateway controller 103 and a media gateway. Public Switched Telephone Network 105 comprises one or more transmission-related nodes such as switches that are used to direct call-related signals from one or more sources to the correct destinations of those signals. Network 105 is capable of handling, in well-known fashion, either analog or digital bearer information in circuit-switched calls among two or more devices such as (i) one or more PSTN terminals 106-1 through 106-S and (ii) media gateway 101-1. Local enterprise network 107 provides for local distribution of analog signals, such as in an enterprise system, and comprises wiring between media gateway 101-1 and analog terminals 108-1 through 108-T.

As those who are skilled in the art will appreciate, telecommunications system 100, and in particular media gateway 101-*p*, is capable in some alternative embodiments of handling other types of networks and other combinations of networks than depicted. Furthermore, in some alternative embodiments, each network might in turn comprise additional networks, such as cellular telephone networks and local area networks that are either wired or wireless. For example, in some embodiments network 102 might comprise a local area network (e.g., of a business enterprise, etc.), in which one or more of IP terminals 104-1 through 104-Q operate.

Media gateway controller 103 is a data-processing system that comprises media gateway controller functionality that is known in the art, controlling media gateways 101-1 through 101-P. Media gateway controller 103 provides the call control and signaling functionality for each media gateway 101-*p*, in well-known fashion. Controller 103 communicates with media gateways 101-1 through 101-P via the H.248 protocol, but as those who are skilled in the art will appreciate, in some alternative embodiments controller 103 can communicate in accordance with a different type of call-control protocol.

In accordance with the illustrative embodiment, controller 103 is physically discrete from media gateways 101-1 through 101-P. However, as those who are skilled in the art will appreciate, in some alternative embodiments, the functionality of controller 103 and the functionality of one or more gateways 101-1 through 101-P might co-exist with each other (i.e., by sharing the same processor, memory, or other resources). In any event, it will be clear to those skilled in the art, after reading this specification, how to make and use media gateway controller 103.

FIG. 1 also depicts multiple telecommunications terminals of various types. Internet Protocol-capable endpoints such as SIP desksets and laptop-based or desktop-based softphones are represented by terminals 104-1 through 104-Q. Plain Old Telephone Service (POTS) terminals, Integrated Services Digital Network (ISDN) phones, cell phones, and other PSTN-associated terminals are represented by terminals 106-1 through 106-S. Analog enterprise desksets are represented by terminals 108-1 through 108-T. As those who are skilled in the art will appreciate, the present invention is also applicable to other combinations of terminals than depicted.

Figure 2:
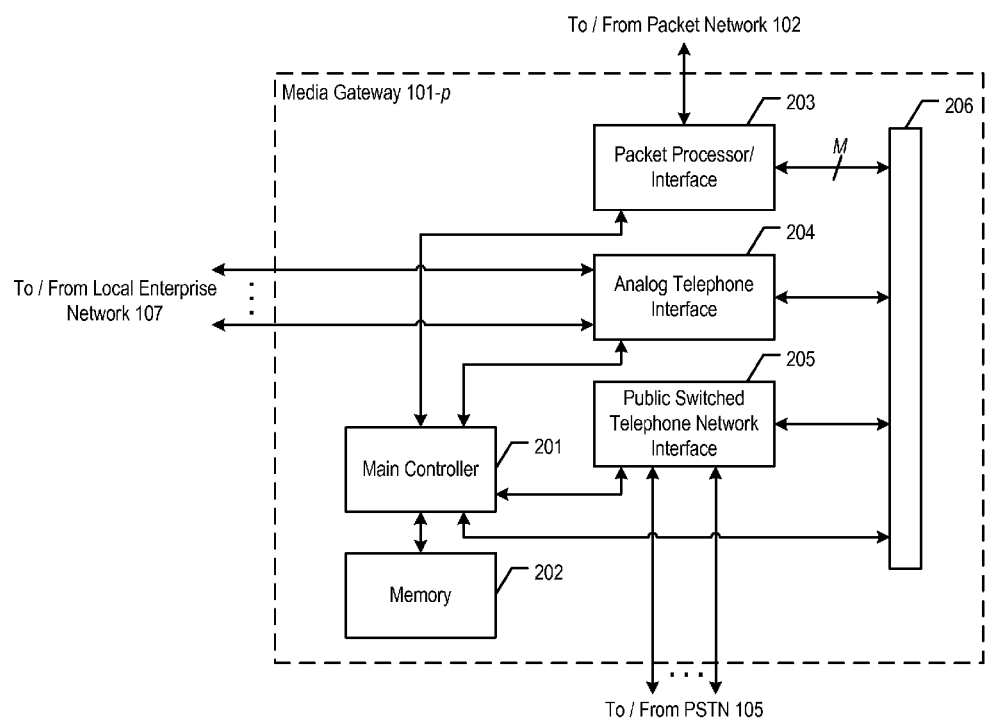
FIG. 2 depicts the salient components of media gateway 101-$p$ in system 100.

FIG. 2 depicts the salient components of media gateway 101-*p*, in accordance with the illustrative embodiment of the present invention. Media gateway 101-*p* comprises main controller 201, memory 202, packet processor/interface 203, analog telephone interface 204, switched telephone network interface 205, and time division multiplexed (TDM) bus 206, interconnected as shown.

Main controller 201 is a general-purpose processor that is capable of controlling processor/interface 203, interface 204, interface 205, and TDM bus 206. Main controller 201 is also capable of executing instructions stored in memory 202, reading data from and writing data into memory 202, and executing the tasks described below and with respect to FIGS. 4 through 7. In some alternative embodiments of the present invention, main controller 201 might be a special-purpose processor. In any event, it will be clear to those skilled in the art, after reading this specification, how to make and use main controller 201.

Memory 202 stores the instructions and data used by main controller 201. Memory 202 might be any combination of dynamic random-access memory (RAM), flash memory, disk drive memory, and so forth. It will be clear to those skilled in the art, after reading this specification, how to make and use memory 202.

Packet processor/interface 203 receives Internet Protocol datagram packets from packet network 102, converts the information encoded in the packets, and forwards the converted information to TDM bus 206, in well-known fashion. Packet processor/interface 203 also receives time division multiplexed packets from TDM bus 206, converts the information encoded in the packets, and forwards the converted information to packet network 102, in well-known fashion. The salient components of packet processor/interface 203 are described below and with respect to FIG. 3. It will be clear to those skilled in the art, after reading this specification, how to make and use packet processor/interface 203.

Analog telephone interface 204 receives signals from local enterprise network 107 and forwards the information encoded in those signals to TDM bus 206, in well-known fashion. Interface 204 also receives signals from TDM bus 206 and forwards the information encoded in those signals to network 107, in well-known fashion. It will be clear to those skilled in the art, after reading this specification, how to make and use analog telephone interface 204.

Switched Telephone Network interface 205 receives signals from PSTN 105 and forwards the information encoded in those signals to TDM bus 206, in well-known fashion. Interface 205 also receives signals from TDM bus 206 and forwards the information encoded in those signals to network 105, in well-known fashion. It will be clear to those skilled in the art, after reading this specification, how to make and use interface 205.

TDM bus 206 carries isochronous traffic between processor/interface 203 and interface 204 or 205, in well-known fashion. It will be clear to those skilled in the art, after reading this specification, how to make and use TDM bus 206.

Figure 3:
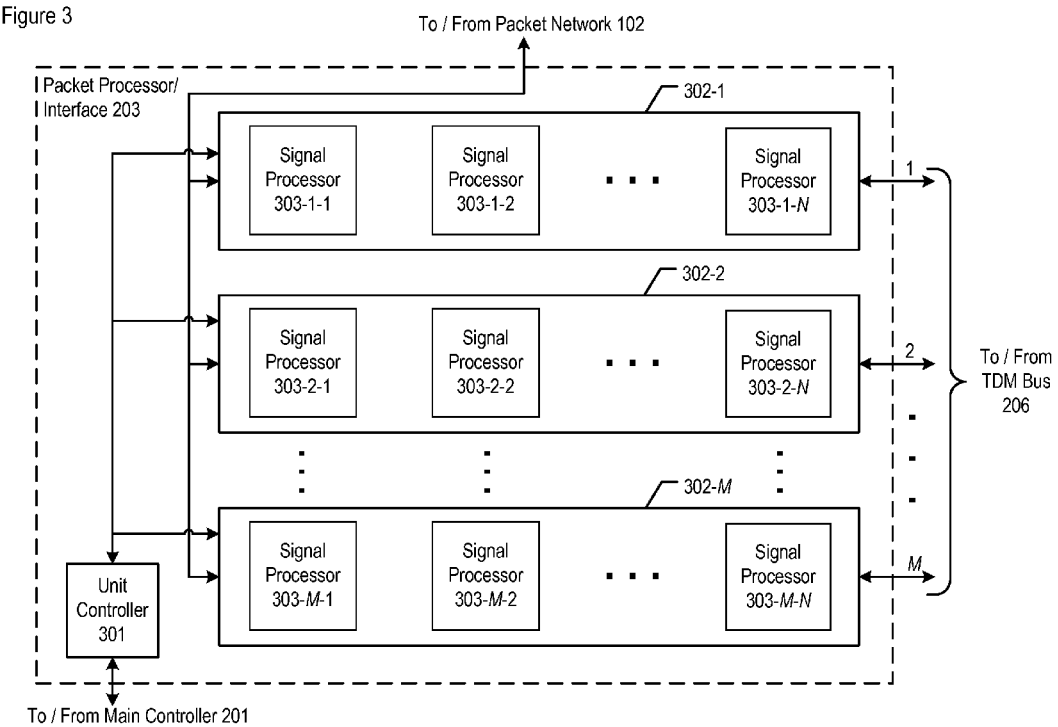
FIG. 3 depicts the salient components of packet processor/interface 203 at media gateway 101-$p$.

FIG. 3 depicts the salient components of packet processor/interface 203, in accordance with the illustrative embodiment of the present invention. Processor/interface 203 comprises unit controller 301 and signal processing units 302-1 through 302-M, wherein M is a positive integer, and are interconnected as shown. In turn, each signal processing unit 302-*m*, for m=1 through M, comprises digital signal processors 303-*m*-1 through 303-*m*-N, wherein N is a positive integer.

Unit controller 301 is a general-purpose processor that is capable of controlling signal processing units 302-1 through 302-M. Unit controller 301 is also capable of executing the tasks described below and with respect to FIGS. 4 through 7. As those who are skilled in the art will appreciate, after reading this specification, in various embodiments unit controller 301 might execute all of the tasks described below or only some of those tasks with main controller 201 executing the rest, or main controller 201 instead might execute all of those tasks. Furthermore, in some alternative embodiments of the present invention, unit controller 301 might be a special-purpose processor. In any event, it will be clear to those skilled in the art, after reading this specification, how to make and use unit controller 301.

Signal processing unit 302-*m* is capable of converting the packets it receives, either from packet network 102 or TDM bus 206, into a different, predetermined format. Since a packet stream that is received, for example, from the IP packet network 102 comprises data packets and control packets, which contain addressing information, unit 302-*m* converts the received packets to a voice data stream of isochronous packets that are suitable for TDM bus 206, while processing the control packets. Unit 302-*m* must perform the conversion in a timely manner to minimize the possibility of packet loss. To handle all of the packets responsively and without delay or jitter, unit 302-*m* uses digital signal processors 303-*m*-1 through 303-*m*-N, which are dedicated devices that are capable of the high-speed packet processing that is required for the conversion. Each digital signal processor 303-*m*-*n* is capable of providing K processing resources such as processing channels, wherein K is a positive integer, in order to handle multiple calls and the different conversion formats across the calls. For example, each conversion format might be distinguished by a different packet size at the datagram packet side of the processing. Protocol standards exist that govern the different packet sizes, as well as other properties such as compression and decompression (as specified in G.711, G.729, and so forth), encryption, and redundancy. Similarly, unit 302-*m* must also perform the conversion in the other direction from a time division multiplexed stream to Internet Protocol packets in a timely manner, as well as control the interval between the creation and transmission of packets.

Unit 302-*m* is uniquely addressable via its own Internet Protocol address. Furthermore, each processing resource of digital signal processor 303-*m*-*n* within unit 302-*m* is accessible by using a User Datagram Protocol (UDP) port number that has been assigned to it by its host media gateway. The UDP port numbers can be reused across signal processor units 302-1 through 302-M because each signal processor unit has a different port number address space, since each unit has its own Internet Protocol address assigned to it. Therefore, each processing resource of digital signal processor 303-*m*-*n* is uniquely addressable by the combination of both (i) the Internet Protocol address of unit 302-*m* and (ii) the port number assigned to the resource. As those who are skilled in the art will appreciate, in some alternative embodiments, a different addressing scheme can be used—for instance, one that uses SIP addresses with port numbers or one that uses IP addresses with a resource identifier other than UDP port number.

It will be clear to those skilled in the art, after reading this specification, how to make and use signal processing unit 302-*m* and its digital signal processors 303-*m*-1 through 303-*m*-N.

Figure 4:
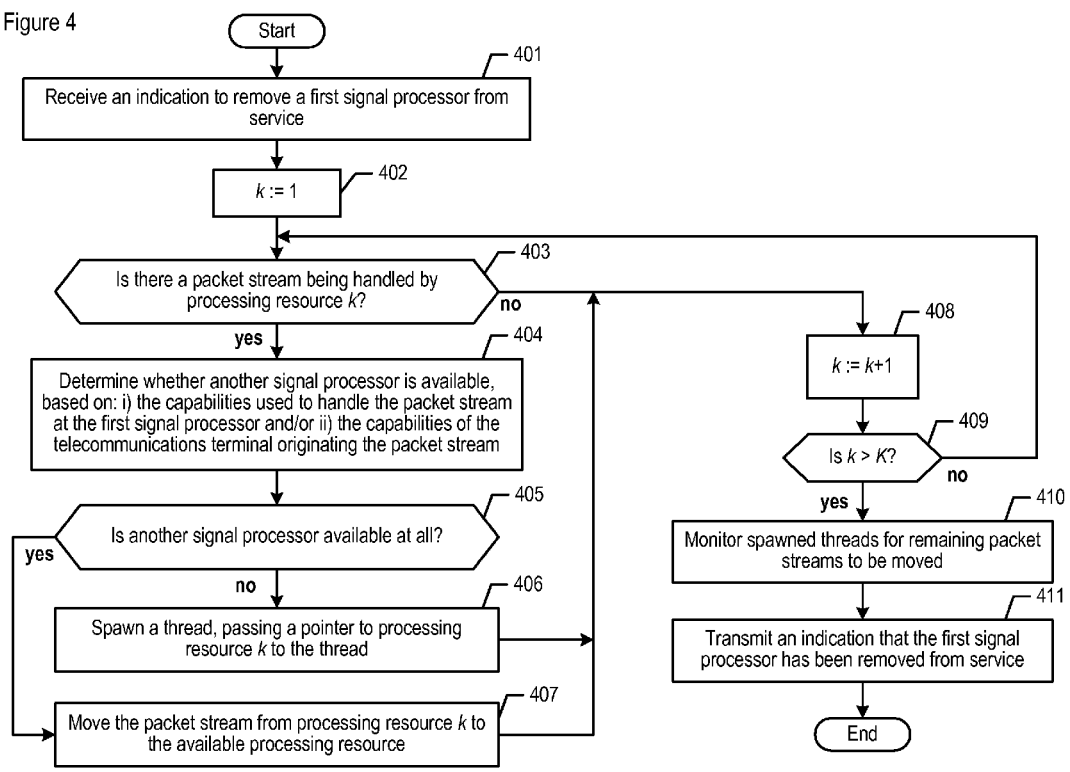
FIG. 4 depicts a flowchart of the salient tasks that involve removing selected digital signal processor 303-$m$-$n$ of packet processor/interface 203 from service, in accordance with the illustrative embodiment of the present invention.

FIG. 4 depicts a flowchart of the salient tasks that involve removing selected digital signal processor 303-*m*-*n* from service, in accordance with the illustrative embodiment of the present invention. For illustrative purposes, digital signal processor 303-1-2 at media gateway 101-1 is the signal processor selected to be removed from service. As those who are skilled in the art will appreciate, some of the tasks that appear in FIG. 4 can be performed in parallel or in a different order than that depicted.

At task 401, media gateway 101-1 receives an indication to remove from service digital signal processor 303-1-2, in well-known fashion. For example, the indication could have been invoked by a technician, by another software program, by another system, and so forth.

At task 402, the variable k is initialized to 1. The variable k is used to keep track, at any given time, of which resource k of the K processing resources in processor 303-1-2 is under consideration to have its currently-assigned packet stream moved over to a digital signal processor other than processor 303-1-2.

At task 403, media gateway 101-1 checks if processing resource k is currently handling a packet stream. If the resource is handling a packet stream, task execution proceeds to task 404. If not, task execution proceeds to task 408.

At task 404, media gateway 101-1 determines whether a different digital signal processor or processors are available to handle the packet stream handled by processing resource k. The determination is based on criteria that include: i) the capabilities that are being used to handle the packet stream at processor 303-1-2; and ii) the capabilities of IP terminal 104-1 (i.e., the terminal originating the packet stream). For example, gateway 101-1 might preferentially identify a resource that can provide that same capability as before over a resource that cannot. As a second example, gateway 101-1 might use the opportunity to move the packet stream over to a "better" resource, such as a codec with more suitable encoding characteristics. In the case of the second example, gateway 101-1 would notify media gateway controller 103 of the change, as described below and with respect to FIG. 7, in order to enable the controller to accept the selection and notify the other end of the call (i.e., IP terminal 104-1).

At task 405, media gateway 101-1 checks if any digital signal processor is available to handle the particular packet stream currently being handled by processing resource k, independent of whether the same signal processing unit as the one handling the packet stream in question can be used. If any processor is available, task execution proceeds to task 407. If no processor is available, task execution proceeds to task 406.

At task 406, media gateway 101-1 spawns a thread that is responsible for rescheduling the search for a new resource and the moving of resource k's packet stream to that new resource. The parameters relevant to the packet stream are passed to the thread, in well-known fashion (e.g., via a memory pointer, via an operating system inter-thread communication mechanism, etc.). The operation of this thread is described below and with respect to FIG. 5. Meanwhile, task execution proceeds to task 408.

At task 407, media gateway 101-1 moves the packet stream currently being handled by resource k to another digital signal processor. Task 407 is described below and with respect to FIG. 6. After task 407, task execution proceeds to task 408.

At task 408, media gateway 101-1 increments the value of the variable k.

At task 409, media gateway 101-1 checks if all of the packet streams have been checked at least once. If all of them have been checked, task execution proceeds to task 410. If not, task execution proceeds back to task 403.

At task 410, media gateway 101-1 continues to monitor the spawned threads from task 407 until the final packet stream has been moved.

At task 411, media gateway 101-1 notifies the technician that requested the removal from service in the first place that digital signal processor 303-1-2 has been removed from service. Task execution then ends.

Figure 5:
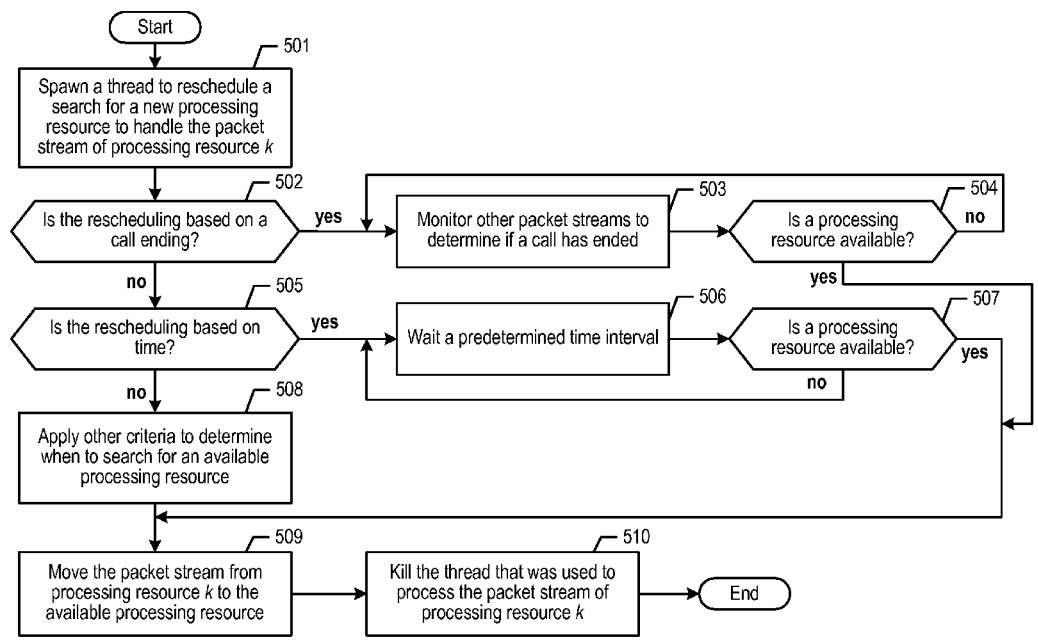
FIG. 5 depicts a flowchart of the salient tasks of the thread spawned for the packet stream handled by processing resource k.

FIG. 5 depicts a flowchart of the salient tasks of the thread spawned for processing resource k's packet stream at task 406, in accordance with the illustrative embodiment of the present invention. For pedagogical purposes, each spawned thread corresponds to exactly one processing resource k; however, as those who are skilled in the art will appreciate, the relationship between a spawned thread and a processing resource can be other than one-to-one. It will be clear to those skilled in the art which tasks depicted in FIG. 5 can be performed simultaneously or in a different order than that depicted.

At task 501 media gateway 101-1 spawns a thread that is responsible for rescheduling the search for a new resource and the eventual moving of resource k's packet stream to that new resource.

At task 502, the thread checks if the rescheduling of a search for a processing resource to handle resource k's packet stream is based on a call that is being handled by another digital signal processor coming to an end, thereby freeing up a processing resource at that digital signal processor. If the rescheduling is based on a call ending, task execution proceeds to task 503. If not, task execution proceeds to task 505.

At task 503, the thread monitors, in well-known fashion, the packet streams that media gateway 101-1 is handling in signal processors other than the one being busied out, to determine if a call is ending.

At task 504, the thread checks if a processing resource has become available as a result of a call having ended. If a call has ended on another digital signal processor and the available processing resource is able to satisfy the needs of processing resource k's packet stream, task execution proceeds to task 509. If not, task execution proceeds back to task 503.

At task 505, the thread checks if the rescheduling of a search for a processing resource is based a time interval. If the rescheduling is based on a time interval, task execution proceeds to task 506. If not, task execution proceeds to task 508.

At task 506, the thread waits a predetermined time interval (e.g., one minute, etc.).

At task 507, after waiting the time interval, the thread checks if a processing resource has become available. One reason as to why a processing resource might have become available is if a call has ended. Another reason is that a maintenance test (e.g., a loop-back test, etc.) was being performed and has since ended, thereby freeing up one or more resources. As those who are skilled in the art will appreciate, there can be other reasons as to why a processing resource might become available. If a processing resource has become available and the available processing resource is able to satisfy the needs of processing resource k's packet stream, task execution proceeds to task 509. If not, task execution proceeds back to task 506.

At task 508, the thread applies alternative criteria to rescheduling the search for a processing resource. For example, packets streams of other calls, such as those calls of a low priority, might simply be forced off of their digital signal processors to free up resources for the packet streams that have to be moved; in this case, the thread might check that another packet stream has been forced off of another signal processor. As those who are skilled in the art will appreciate, other criteria can be applied to determine when to search for an available resource.

At task 509, the thread executes the tasks that are described above and with respect to FIG. 6, which results in resource k's packet stream being moved to another digital signal processor.

At task 510, the thread for handling resource k's packet stream dies.

Figure 6:
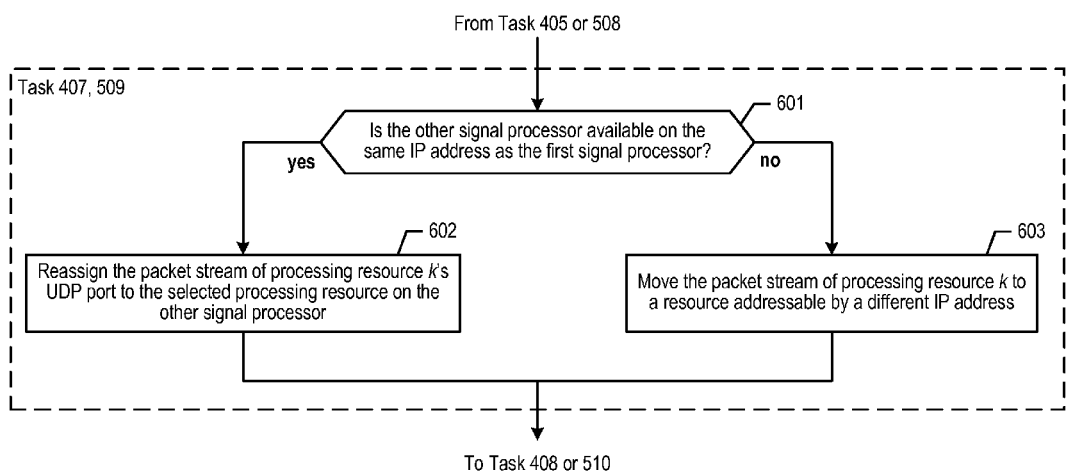
FIG. 6 depicts a flowchart of the salient tasks that involve moving the packet stream from processing resource k to another processing resource at another digital signal processor of packet processor/interface 203, in accordance with the illustrative embodiment of the present invention.

FIG. 6 depicts a flowchart of the salient tasks that involve moving resource k's packet stream to another processing resource at another digital signal processor 303-*m-n*, in accordance with the illustrative embodiment of the present invention. Depending on how the tasks are invoked, the depicted tasks are subtasks of either task 407 or task 509. As those who are skilled in the art will appreciate, some of the tasks that appear in FIG. 6 can be performed in parallel or in a different order than that depicted.

At task 601, media gateway 101-1 checks if an available digital signal processor, possibly one of multiple available processors, is addressable by the same Internet Protocol address as processor 303-1-2. If the available processor uses the same IP address, task execution proceeds to task 602. If not, task execution proceeds to task 603.

At task 602, media gateway 101-1 reassigns the UDP port number for resource k's packet stream to a different digital signal processor, such as processor 303-1-5, within signal processing unit 303-1. It will be clear to those skilled in the art how media gateway 101-1 assigns and reassigns port numbers dynamically. Task execution then proceeds to task 408 or task 510, depending on how the tasks depicted in FIG. 6 were invoked.

At task 603, media gateway 101-1 moves resource k's packet stream to a different signal processing unit, such as unit 302-2, with a different Internet Protocol address. The messaging that is associated with task 603 is described below and with respect to FIG. 7. After task 603 is completed, task execution proceeds to task 408 or task 510, depending on how the tasks depicted in FIG. 6 were invoked.

Figure 7:
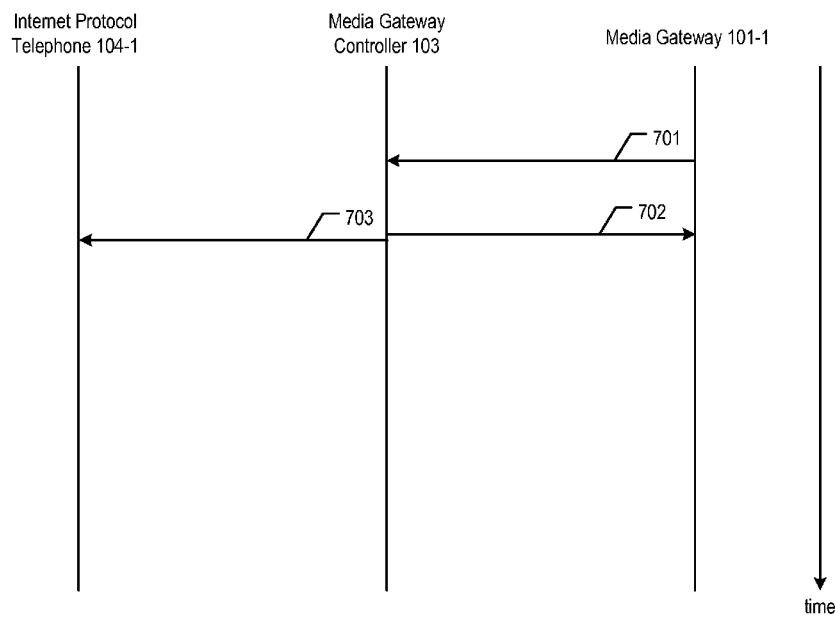
FIG. 7 depicts a message flow diagram of an information exchange between media gateway 101-1 and message gateway controller 103, in accordance with the illustrative embodiment of the present invention.

FIG. 7 depicts a message flow diagram of an information exchange between media gateway 101-1 and media gateway controller 103, in accordance with the illustrative embodiment of the present invention. The events in FIG. 7 occur as the result of task 603 having been invoked or if one or more media stream properties (e.g., the codec to be used, etc.) are changed. It will be clear to those skilled in the art which events depicted in FIG. 7 can occur simultaneously or in a different order than that depicted.

Message 701 is transmitted by media gateway 101-1 to media gateway controller 103, in accordance with the illustrative embodiment of the present invention. Gateway 101-1 uses message 701 to request controller 103's approval to use a different processing resource than the resource handling a particular packet stream. Message 701 specifies a different Internet Protocol address than the one being used for the packet stream, as well as a UDP port number. In some embodiments, message 701 specifies more than one IP address.

Message 702 is transmitted by media gateway controller 103 to media gateway 101-1, in response to message 701. Controller 103 uses message 702 to indicate to gateway 101-1 that the request has been accepted and that the packet stream going forward will be associated with the new Internet Protocol address and port number. The new addressing information corresponds to a digital signal processor on a different signal processing unit at gateway 101-1. Controller 103 also transmits message 703 to the endpoint associated with the packet stream, in this case Internet Protocol telecommunications terminal 104-1. Terminal 104-1 then uses the new addressing information to determine where to send its packets going forward and which packets are the ones that the terminal should be receiving, as part of its call, given that the packet stream is being moved to a different processing resource at gateway 101-1.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment"

or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving a first indication to remove from service a first signal processor that is handling a first packet stream via a first processing resource, wherein said first processing resource is addressable by a first port number;
   determining, in response to receiving said first indication, whether a second signal processor is available to handle said first packet stream;
   when said second signal processor is available, reassigning said first port number to a second processing resource in said second signal processor; and
   wherein said first signal processor is also handling a second packet stream via a third processing resource, and wherein said third processing resource is addressable by a second port number, the method further comprising:
   determining, in response to receiving said first indication, whether a third signal processor is available to handle said second packet stream; and
   reassigning said second port number to a fourth processing resource in said third signal processor.

2. The method of claim 1 further comprising transmitting a second indication which indicates that said first signal processor has been removed from service.

3. The method of claim 1 wherein said second signal processor and third signal processor are different.

4. The method of claim 1 wherein said first signal processor is further addressable by a first Internet Protocol address, and wherein said first signal processor and said second signal processor have the same Internet Protocol address.

5. The method of claim 1 wherein the determination of said second signal processor is based on at least one of: i) the capabilities being used to handle said first packet stream at said first signal processor, and ii) the capabilities of a telecommunications terminal that is originating said first packet stream.

6. The method of claim 5 wherein said first packet stream is of a Voice over Internet Protocol call involving said telecommunications terminal, and wherein said first port number is a Universal Datagram Protocol port number.

7. A method comprising:
   receiving a first indication to remove from service, at a first data-processing system, a first signal processor that is handling a first packet stream via a first processing resource, wherein said first signal processor is addressable by a first Internet Protocol address, and wherein said first processing resource is addressable by a first port number;
   determining, at a first time, whether a second signal processor that is addressable by said first Internet Protocol address is available to handle said first packet stream;
   when said second signal processor is unavailable, rescheduling a search for said second signal processor to occur at a later time than said first time; and
   wherein said first signal processor is also handling a second packet stream via a third processing resource, and wherein said third processing resource is addressable by a second port number, the method further comprising:
   determining, in response to receiving said first indication, whether a third signal processor is available to handle said second packet stream; and
   when said third signal processor is available, reassigning said second port number to a fourth processing resource in said third signal processor.

8. The method of claim 7 further comprising transmitting a second indication which indicates that said first signal processor has been removed from service;
   wherein said first data-processing system and said second data-processing system are physically discrete from each other.

9. The method of claim 7 further comprising:
   determining, at said later time, whether said second signal processor that is addressable by said first Internet Protocol address is available to handle said first packet stream; and
   when said second signal processor is unavailable, transmitting a first message to a second data-processing system, wherein said first message comprises at least a second Internet Protocol address, and wherein a plurality of signal processors that excludes said first signal processor is addressable by said second Internet Protocol address;
   wherein said first data-processing system and said second data-processing system are physically discrete from each other.

10. The method of claim 9 wherein said first data-processing system is a media gateway, wherein said second data-processing system is a media gateway controller, and wherein said first message is transmitted in a manner that is consistent with the H.248 protocol.

11. The method of claim 7 wherein the determination of whether said second signal processor is available is based on at least one of: i) the capabilities being used to handle said first packet stream at said first signal processor, and ii) the capabilities of a telecommunications terminal that is originating said first packet stream.

12. The method of claim 7 wherein the rescheduling is based on the ending of a call handled by a signal processor other than said first signal processor.

13. A method comprising:
   receiving a first indication to remove from service, at a first data-processing system, a first signal processor that is handling a first packet stream via a first processing resource, wherein said first signal processor is addressable by a first Internet Protocol address, and wherein said first processing resource is addressable by a first port number;
   determining whether a second signal processor that is addressable by said first Internet Protocol address is available to handle said first packet stream;
   when said second signal processor is unavailable, transmitting a first message to a second data-processing system, wherein said first message comprises at least a second Internet Protocol address, and wherein a plurality of signal processors that excludes said first signal processor is addressable by said second Internet Protocol address; and
   wherein said first signal processor is also handling a second packet stream via a third processing resource, and wherein said third processing resource is addressable by a second port number, the method further comprising:

determining, in response to receiving said first indication, whether a third signal processor is available to handle said second packet stream; and when said third signal processor is available, reassigning said second port number to a fourth processing resource in said third signal processor.

14. The method of claim 13 further comprising transmitting a second indication which indicates that said first signal processor has been removed from service.

15. The method of claim 13 wherein the determination of whether said second signal processor is available is based on at least one of: i) the capabilities being used to handle said first packet stream at said first signal processor, and ii) the capabilities of a telecommunications terminal that is originating said first packet stream.

16. The method of claim 15 wherein said first packet stream is of a Voice over Internet Protocol call involving said telecommunications terminal, and wherein said first port number is a Universal Datagram Protocol port number.

17. The method of claim 13 wherein said first data-processing system is a media gateway, wherein said second data-processing system is a media gateway controller, and wherein said first message is transmitted in a manner that is consistent with the H.248 protocol.

* * * * *